(12) United States Patent
Puck et al.

(10) Patent No.: US 9,702,414 B2
(45) Date of Patent: Jul. 11, 2017

(54) FRICTION CLUTCH

(71) Applicant: Magna Powertrain GmbH & Co KG, Lannach (AT)

(72) Inventors: Hannes Puck, Stainz (AT); Johannes Quehenberger, Raaba (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 0 days.

(21) Appl. No.: 14/899,303

(22) PCT Filed: May 27, 2014

(86) PCT No.: PCT/EP2014/060983
§ 371 (c)(1),
(2) Date: Dec. 17, 2015

(87) PCT Pub. No.: WO2014/206677
PCT Pub. Date: Dec. 31, 2014

(65) Prior Publication Data
US 2016/0146267 A1    May 26, 2016

(30) Foreign Application Priority Data

Jun. 25, 2013 (DE) .................. 10 2013 212 089

(51) Int. Cl.
| F16D 13/74 | (2006.01) |
| F16D 13/04 | (2006.01) |
| F16D 13/72 | (2006.01) |
| F16D 13/52 | (2006.01) |
| F16D 23/12 | (2006.01) |

(52) U.S. Cl.
CPC .............. *F16D 13/74* (2013.01); *F16D 13/04* (2013.01); *F16D 13/52* (2013.01); *F16D 13/72* (2013.01);

(Continued)

(58) Field of Classification Search
CPC .......... F16D 13/04; F16D 13/52; F16D 13/72; F16D 13/74; F16D 23/12; F16D 2023/123

See application file for complete search history.

(56) References Cited

U.S. PATENT DOCUMENTS

| 2,968,381 A | 1/1961 | Vosler |
| 4,544,055 A | 10/1985 | Kronstadt |

(Continued)

FOREIGN PATENT DOCUMENTS

| DE | 10124583 A1 | 11/2002 |
| DE | 202005017525 U1 | 3/2006 |

(Continued)

OTHER PUBLICATIONS

International Search Report Mailed Oct. 11, 2014 in International PCT Application Serial No. PCT/EP2014/060983.

*Primary Examiner* — Jacob S Scott
(74) *Attorney, Agent, or Firm* — Dickinson Wright PLLC

(57) ABSTRACT

A friction clutch for a motor vehicle for frictional coupling a first shaft and a second shaft, comprising a plurality of clutch discs articulated interactively on a clutch basket and a clutch hub, wherein the first shaft is connected to the clutch basket and the second shaft is connected to the clutch hub and the clutch discs are selectively coupled by an associated actuation unit. Associated with the clutch basket is an oil-collection and guiding arrangement through which oil spun off the clutch basket is collected and delivered into a collection region outside the clutch basket. A switching device coupled to the actuation unit controls the backflow of the oil from the collection region outside the clutch basket (KK) in the direction of the clutch discs.

14 Claims, 2 Drawing Sheets

Figure 1:
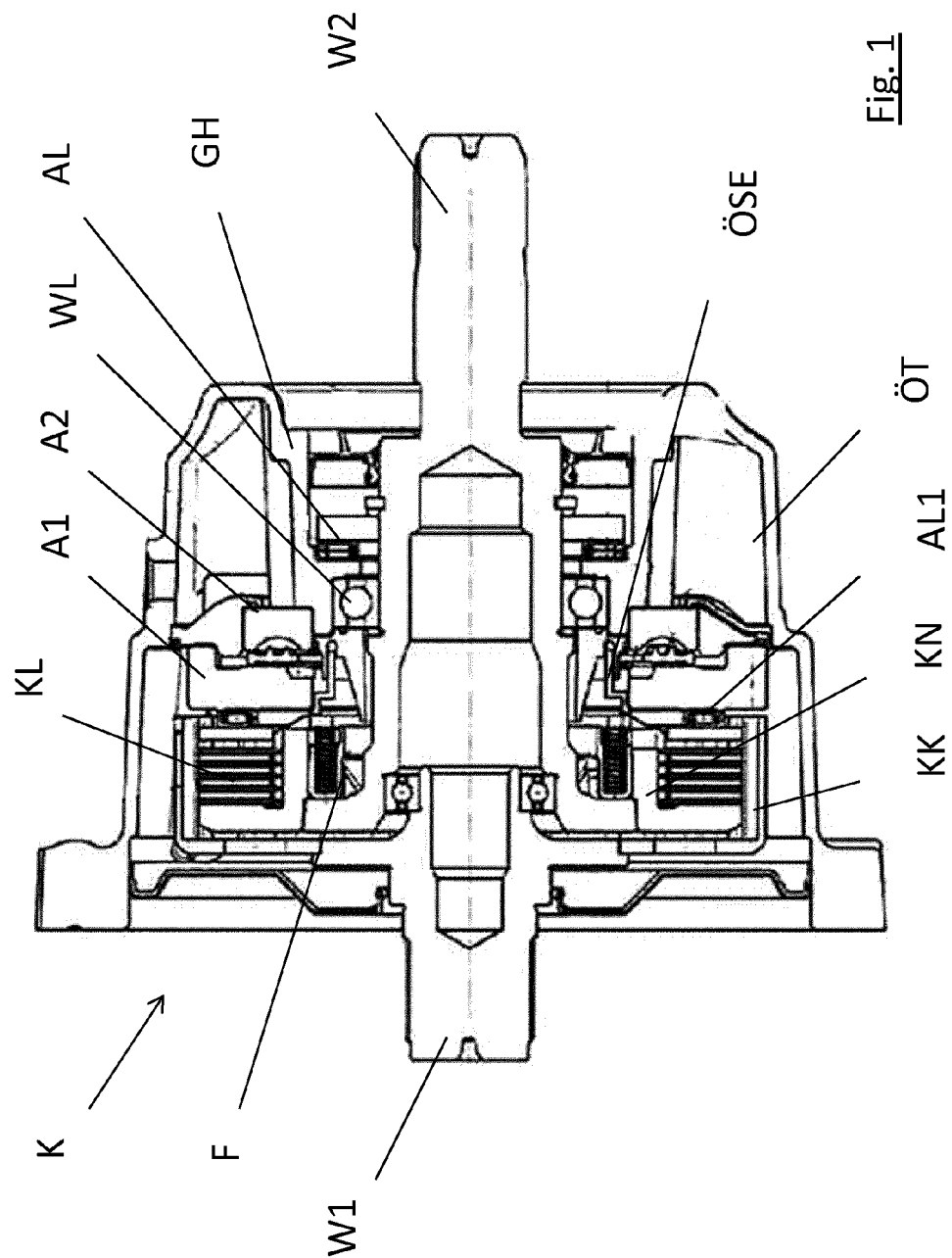

(52) U.S. Cl.
CPC ........ *F16D 23/12* (2013.01); *F16D 2023/123* (2013.01)

(56) References Cited

U.S. PATENT DOCUMENTS

| | | |
|---|---|---|
| 7,234,580 B2 | 6/2007 | Li et al. |
| 2005/0224310 A1 | 10/2005 | Li et al. |
| 2009/0008207 A1 | 1/2009 | Hirota et al. |
| 2015/0267758 A1* | 9/2015 | Leitgeb ............ F16D 13/72 192/113.34 |

FOREIGN PATENT DOCUMENTS

| | | |
|---|---|---|
| DE | 102008021418 A1 | 11/2008 |
| DE | 112007000463 T5 | 12/2008 |
| DE | 102010033865 A1 | 4/2011 |
| DE | 102011113782 B3 | 10/2012 |
| EP | 1128081 A2 | 8/2001 |
| EP | 1445506 A1 | 8/2004 |
| EP | 2093092 A2 | 8/2009 |
| EP | 2116411 A1 | 11/2009 |
| GB | 578289 A | 6/1946 |
| JP | H02256926 A | 10/1990 |
| JP | H0893792 A | 4/1996 |
| JP | H0925945 A | 1/1997 |
| JP | 2005299735 A | 10/2005 |
| JP | 2006071070 A | 3/2006 |
| JP | 2008202656 A | 9/2008 |
| JP | 2010254058 A | 11/2010 |
| WO | WO2006015394 A1 | 2/2006 |
| WO | WO2009140102 A2 | 11/2009 |

\* cited by examiner

FRICTION CLUTCH

CROSS-REFERENCE TO RELATED APPLICATIONS

This application is a National Stage of International Application No. PCT/EP2014/060983, filed May 27, 2014, which claims the benefit and priority of German Patent Application No. DE 10 2013 212 089.3, filed Jun. 25, 2013. The entire disclosures of each of the above applications are incorporated herein by reference.

FIELD

The present invention relates to a friction clutch for a motor vehicle.

BACKGROUND

This section provides background information related to the present disclosure which is not necessarily prior art.

Friction clutches of the type stated are used in motor vehicles with selectable four-wheel drive, in which a drive torque can be fed to a second, selectable axle. The clutch, which is designed as a multi-plate clutch, can be actuated by means of an actuator, i.e. the drive torque can be applied and removed. DE 10 2010 033 865 A1 shows a drive system of this kind.

DE 20 2005 017 525 U1 describes a friction clutch comprising a multi-plate clutch and an actuation device. The actuation device comprises two actuator rings, between which balls run on ramp-shaped structures. When the actuator rings are rotated relative to one another, this actuation device has a closing effect, i.e. the plates are pressed together. The force of the actuation device acts on the multi-plate clutch via an axial bearing. To release the pressure, a spring system designed as a diaphragm spring assembly is provided.

In the released mode, when there is separation by means of the clutch, a residual torque is transmitted in the devices according to the prior art.

An improvement in the actuating dynamics of a multi-plate clutch is provided by DE 10 2008 021 418 A1. In particular, a stop device which limits the release travel is provided. The release travel of the clutch is set in accordance with the temperature.

The residual torque can also be reduced through the design of the plates. Examples of this are shown by US 2005/0224310 A1, U.S. Pat. No. 2,968,381, GB578289A, EP 1 128 081 A2 and U.S. Pat. No. 7,234,580 B2.

A multi-plate clutch with lubrication when required is disclosed by EP 1 445 506 A1. The supply of lubricant is controlled by means of a selector valve.

DE 101 24 583 A1 attempts to reduce the residual torque in a multi-plate clutch by means of a coupling device which couples at least some of the plates independently of the plate carrier.

SUMMARY

This section provides a general summary of the inventive concepts associated with the present disclosure and is not intended to represent a comprehensive disclosure of its full scope or all of its features, objects and aspects.

It is an object of the present invention to provide a friction clutch in a form which is improved over the known solutions.

The aforementioned object is achieved by a friction clutch according to the invention having a plurality of oil-lubricated clutch plates articulated alternately on a clutch cage and a clutch hub, wherein a first shaft is connected to the clutch cage and a second shaft is connected to the clutch hub, the clutch plates are coupled by means of an associated actuation unit, wherein the clutch cage is assigned an arrangement by means of which the oil flung off the clutch cage is collected and delivered into a collection region outside of the clutch cage and the clutch plates, wherein a switching device coupled to the actuation unit controls the return of the oil from the collection region outside of the clutch cage and the clutch plates in the direction of the clutch plates.

By means of the arrangement according to the invention, it is possible, with a simple clutch construction, to switch the clutch so that it is free from oil in the released state, i.e. when the actuation unit is actuated in a releasing direction. By means of an oil-collection and guiding arrangement arranged radially to the outside of the clutch cage, the oil flung radially off the clutch plates within the clutch cage, is collected and delivered in the direction of a collection region. When the actuation unit is actuated in the releasing direction, i.e. when the clutch is released—the plates being separated—the oil is carried out of the clutch region and oil return is stopped. In this released state, the clutch region becomes free from oil as quickly as possible, thus minimizing residual torque. When the actuation unit is actuated in an engagement direction, the clutch is engaged and the actuation unit applying the pressure to the plates re-enables return from the collection region to the clutch plates, ensuring that the clutch region is filled with oil again.

According to one embodiment of the invention, the collection region for the oil outside the region of the clutch plates is designed as an oil tank. This oil tank is preferably arranged in a part of the housing accommodating the clutch.

The very largely oil-free state of the plate system in the released state reduces the residual drag torque without the occurrence of increased wear or damage to the clutch system. When the clutch is reengaged, the actuation unit re-enables the oil flow from the collection region, the oil tank, in the direction of the plate system—lubrication is already ensured once more in the coupling phase.

According to an advantageous embodiment of the invention, the collection region, the oil tank, is arranged in the housing of the clutch, namely in a region approximately radially at the level of the plates, the coupling region. The size of the oil tank is chosen so that the entire quantity of oil can be held.

One embodiment of the invention envisages that the oil-collection and guiding arrangement is designed as a sheet-metal part, such as a sheet-metal strip, arranged radially to the outside of the clutch cage. Here, the sheet-metal strip extends with a radially upward slope from the clutch in the direction of the oil tank. The oil flung off the clutch cage, radially is thus collected and carried in the direction of the oil tank by the effect of centrifugal force.

As a developmental measure, it is envisaged that the clutch cage, to which some of the plates are coupled for conjoint rotation and in an axially movable manner, has openings through which the oil can flow off radially to the outside of the clutch cage. The oil is then flung off the outside of the clutch cage and passed in the direction of the oil tank via the oil-collection and guiding arrangement.

One embodiment of the invention envisages that the actuation unit is designed as a ball ramp mechanism, having an axially fixed actuator ring and an axially movable and rotatable actuator ring. The rotatable actuator ring is actuated by an associated electric motor via a screw or worm drive. For this purpose, the rotatable actuator ring has toothing in its outer region, in which a motor-driven worm engages. The rotatable actuator ring acts on the plate assembly via an axial bearing and a pressure plate and pushes the plates against the axially supported clutch cage. A spring system brings about the release of the plates when the actuation unit is actuated in the direction of release. The pressure plate acting on the plates, which is moved axially by the rotating actuator ring, thus undergoes a movement away from the plates—these are then loose and no longer transmit any torque.

The invention is particularly advantageous if the plates of the clutch system are configured in such a way that disconnection of torque transmission as quickly and effectively as possible is ensured. This can be accomplished using plates known per se with a shaft design. The plates connected for conjoint rotation to the clutch cage are corrugated in their plane and interact in an alternative arrangement with level, flat plates which are coupled for conjoint rotation to the clutch hub. The shaft design results in rapid release of the plates from one another, and the oil trapped in the clutch system can thus flow off rapidly owing to the centrifugal forces.

Another possibility for improving the effect according to the invention is obtained if clutch disks with channels extending radially across the clutch surface are used. These clutch disks are coupled for conjoint rotation to the clutch hub—while the oil between the plates can flow off easily through the channels, the radial grooves.

Further areas of applicability will become apparent from the detailed written description provided herein. The description and specific examples provided in this summary section are intended for purposes of illustration only and are not intended to limit the scope of the present disclosure.

DRAWINGS

Figure 2:
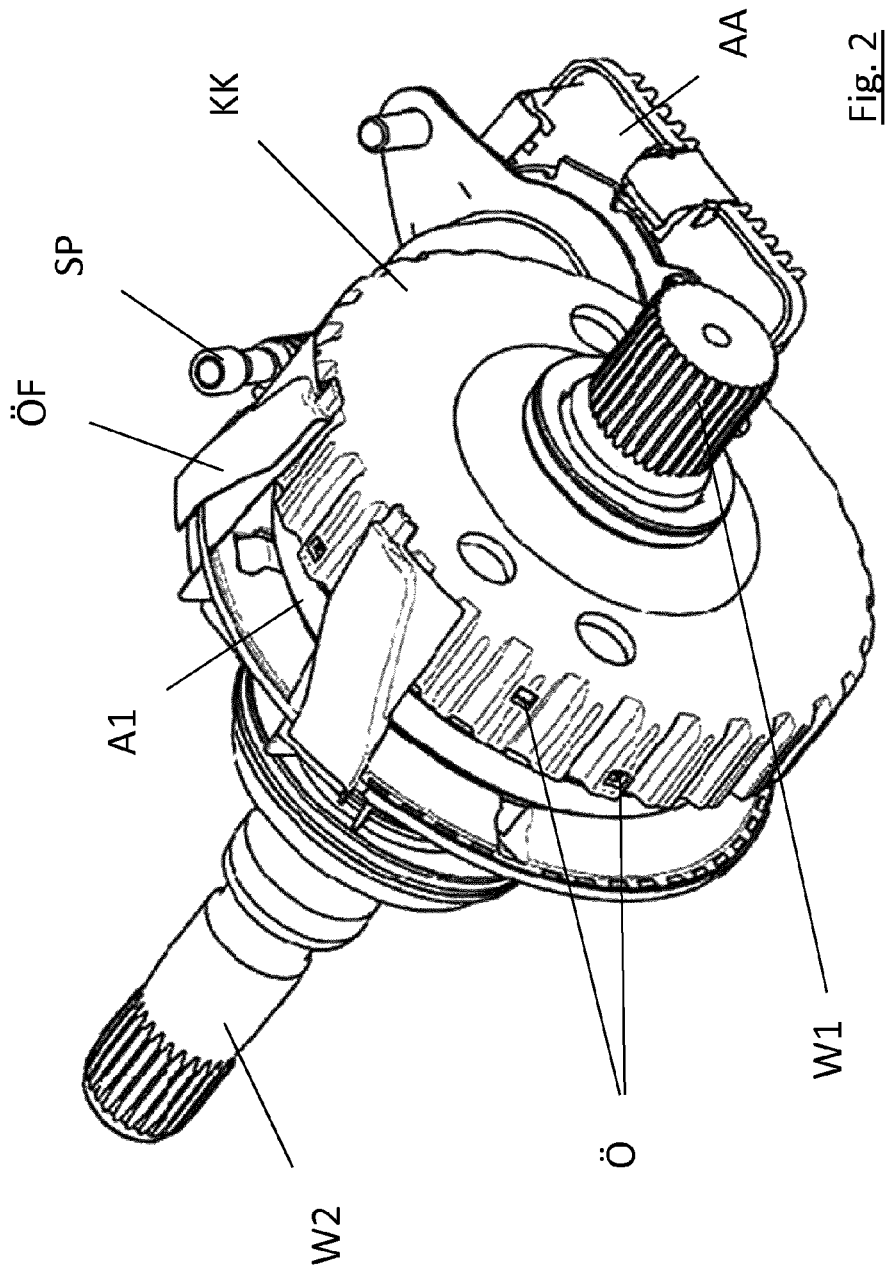

The drawings described herein are for illustrative purposes only of selected embodiments and not all implementations and are not intended to limit the present disclosure to only that actually shown. With this in mind, various features and advantages of example embodiments of the present disclosure will become apparent from the written description when considered in combination with the appended drawings, wherein:

FIG. 1 shows a sectional view of an embodiment of a friction clutch according to the invention; and FIG. 2 shows a perspective view of the friction clutch according to the invention, more specifically without the housing.

DETAILED DESCRIPTION

An illustrative embodiment of the invention is furthermore explained by means of the drawings.

FIG. 1 shows an embodiment of a friction clutch assembly according to the invention in section. The friction clutch assembly includes a clutch K which connects a first shaft W1 to a second shaft W2, wherein the first shaft W1 is coupled to the rear axle/final drive or the main transmission of the vehicle, and wherein the second shaft W2 is connected to a wheel or the cardan shaft of the motor vehicle. The two shafts W1, W2 extend coaxially and can move in rotation relative to one another.

A clutch cage KK is connected for conjoint rotation to shaft W1. A clutch hub KN is connected for conjoint rotation to shaft W2. The two shafts W1, W2 are held in a housing GH by means of a rolling bearing in a manner which allows them to move in rotation relative to one another.

Arranged in the clutch cage KK are clutch plates KL, which are alternately coupled for conjoint rotation and axial movement to the clutch cage KK via corresponding external toothing and to the clutch hub KN via corresponding internal toothing. The actuation unit associated with the plates KL comprises two actuator rings A1, A2, between which are arranged balls (not shown), which run in ramp-shaped structures on the rings A1, A2 and form a ball ramp mechanism. The actuator ring A2 is fixed in relation to the housing, i.e. said ring is arranged in a fixed manner in the housing GH of the clutch K and is press-fitted in a corresponding seat. Shaft W2 is supported relative to the housing GH by means of a rolling bearing WL, while a small axial needle bearing AL is provided for axial support, said needle bearing being arranged between the housing GH and a supporting disk on shaft W2.

The rotatable actuator ring A1 acts on the clutch plates KL via a large axial bearing AL1 and brings about the contact pressure required for torque transmission on the plate system. Here, the contact pressure movement of the actuator ring A1 is counteracted by the force of springs F which are arranged within the clutch hub and bring about release of the clutch, of the clutch plates KL.

The rotatable actuation ring A1 is moved axially in the direction of the clutch plates KL by the ball ramp principle using balls (not shown) guided in a cage. For this purpose, the actuation ring A1 has toothing on part of its outer circumference engaged with the thread on a rotatable spindle driven by an electric motor.

The front part of the housing GH, which lies radially substantially at the level of the clutch plates KL, forms an oil tank ÖT, in which the oil for the clutch K can be held. The size of the oil tank ÖT, which, in the form of an annular ring, surrounds the part of the housing GH shaped as an indentation, is such that the entire quantity of oil for the clutch K can be held.

If the entire quantity of oil for the clutch K is in the oil tank ÖT, the oil flow in the direction of the clutch plates KL is enabled by an oil switching unit ÖSE that is opened through rotation of the actuator ring A1. When the clutch K is closed, the actuator ring A1 closes the clutch plates KL in the rotated and axially advanced state, i.e. when there is torque transmission, such that the oil switching unit ÖSE is opened and the oil flow in the direction of the clutch plates KL is enabled. When the clutch K is opened, the clutch plates KL are released by rotating the actuator ring A1 back with an axial reverse movement, such that the oil switching unit ÖSE is closed and oil flow is stopped.

FIG. 2 shows a perspective view of the clutch according to the invention, more specifically without the housing GH. In its outer region, the clutch cage KK has—in addition to the visible openings on the end, which serve, in particular, for oil inflow—openings Ö through which oil can flow outward out of the region of the clutch plates KL owing to the centrifugal force. An oil-collection and guiding arrangement ÖF configured as a formed sheet, a sheet-metal strip, receives some of the oil flung off the clutch cage KK and guides it in accordance with the slope in the direction of the oil tank ÖT, which is situated at the rear in the depiction shown in FIG. 2. During this process, the flinging effect drives the oil on the sheet extending outward in the direction of the oil tank ÖT.

When the clutch K is closed—the clutch plates KL being pressed together by the actuator ring A1 for torque transmission—the oil switching unit ÖSE is opened and the oil from the tank space ÖT can flow into the clutch space, from where it is delivered back in the direction of the oil tank ÖT via the oil-collection and guiding arrangement ÖF. It thus forms an equilibrium of the oil quantity in the clutch space KL and oil tank ÖT.

Once the clutch K has been released by appropriate rotation of the actuator ring A1, with the clutch plates KL separated, the oil switching unit ÖSE is closed. The oil flung off the rotating clutch cage KK is delivered in the direction of the oil tank ÖT by means of the oil-collection and guiding arrangement ÖF and is prevented from flowing back in the direction of the clutch space KL by the closed oil switching unit ÖSE. The clutch plates KL thus run dry in the released state, and therefore operation very largely without residual torque is possible.

The drive for the rotatable and axially movable actuator ring A1 is shown in FIG. 2. An actuating spindle SP, which is fixedly mounted in the axial direction, interacts with toothing formed on the outer circumference of the actuator ring A1. The actuating spindle SP is driven by an actuator drive AA, an electric motor, to which an electronic control unit in a housing is assigned.

The toothing of the actuator ring A1 is of a width in the axial direction such that it remains in engagement with the actuating spindle SP over the axial movement path.

In one embodiment, the oil-collection device ÖF and the element for separating the oil spaces can be embodied as a single component.

The oil-collection and oil-separating arrangement ÖF is embodied in such a way that the clutch space remains free from oil and the plates no longer dip into an oil bath (apart from wetting of the surfaces).

Thus, not only the switching off of the oil supply but also the emptying of the clutch space (dry sump) is ensured. In addition, the lubrication concept is switched from dip lubrication or splash lubrication which means that the cage KK dips into the oil when stationary and at low and medium speeds, to dry operation when the clutch is completely open.

For clean separation of the tank space and the clutch space, there are, on the oil-collection device ÖF, separating and guiding elements which also perform the separating function, or on the housings there are special machined features and/or surface properties, and/or sealing elements which serve for sealing and preventing or reducing leaks into the clutch region in "dry operation". Only by this means is it ensured that the clutch space does not refill with oil and the flinging out of oil does not have to begin again when the vehicle is stationary for a brief period, for example.

The dry sump system is used together with an enlarged release travel to lower the residual torques in the clutch.

The dry sump system can assist at two operating points of the clutch:

1. Reduction of splash losses. This works for connect and disconnect operation. Connect operation means that, although the clutch is open, the drive train to the secondary axle is not decoupled by a second unit.
2. Reduction of the residual torque. Here, residual torque is the torque which is transmitted via the clutch even when it is actually open. This works or makes sense especially in a disconnect mode, in which very high differential speeds of rotation occur since the secondary axle is completely decoupled and comes to a halt.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS

W1 first shaft
W2 second shaft
K clutch
KK clutch cage
KN clutch hub
WL rolling bearing
AL axial bearing, axial needle bearing
GH housing
A1 first actuator ring, actuation ring
A2 second actuator ring, actuation ring
F spring element
AL1 axial bearing, axial needle bearing
ÖT collection region for oil, oil tank
ÖSE oil switching unit
ÖF oil-collection and guiding arrangement
Ö opening in clutch cage
SP actuating spindle
AA actuation drive

The invention claimed is:

1. A friction clutch for a motor vehicle comprising a first shaft, a second shaft, a plurality of clutch plates articulated alternately on a clutch cage and a clutch hub, wherein the first shaft is connected to the clutch cage and the second shaft is connected to the clutch hub, the clutch plates are selectively coupled by means of an associated actuation unit, wherein the clutch cage is surrounded by an oil-collection and guiding arrangement such that oil flung off the clutch cage is collected and delivered into a collection region outside of the clutch cage, and wherein a switching device coupled to the actuation unit controls the return of the oil from the collection region outside of the clutch cage in the direction of the clutch plates.

2. The friction clutch as claimed in claim 1, wherein the clutch, together with the actuation unit are arranged in a housing, and wherein the collection region is an oil tank designed as part of the housing.

3. The friction clutch as claimed in claim 2, wherein the oil tank is capable of holding the entire quantity of oil allocated to the clutch.

4. The friction clutch as claimed in claim 1, wherein the actuation unit comprises a fixed actuation ring and a rotationally and axially movable actuation ring, between which balls run in ramp-shaped structures.

5. The friction clutch as claimed in claim 4, wherein the switching device is actuated by the rotationally and axially movable actuation ring.

6. The friction clutch as claimed in claim 2, wherein the oil-collection and guiding arrangement surrounding the clutch cage is designed as a sheet-metal part which extends outward in the direction of the oil tank.

7. The friction clutch as claimed in claim 1, wherein the clutch cage has openings in the outer region to allow oil to exit.

8. The friction clutch as claimed in claim 2, wherein the housing has at least one of special machined features, surface properties, and sealing elements for separating the oil tank.

9. A friction clutch assembly for use in a motor vehicle, comprising:
   a housing defining a coupling region and an oil collecting region;
   first and second rotary members disposed in the coupling region of the housing and supported for relative rotation;
   a clutch disposed in the coupling region of the housing and including a clutch cage fixed for rotation with the first rotary member, a clutch hub fixed for rotation with the second rotary member, and a set of clutch plates alternately coupled for cojoint rotation with the clutch cage and the clutch hub;
   an actuation unit disposed in the coupling region of the housing and having an actuator ring moveable relative to the clutch plates in a first direction to frictionally engage the clutch plates and place the clutch in an engaged state and in a second direction to release engagement of the clutch plates and place the clutch in a released state;
   a power-operated actuator for selectively moving the actuator ring to shift the clutch between its engaged and released states;
   an oil collecting and guiding device surrounding the clutch cage and disposed within the housing to delineate the oil collection region from the coupling region, the oil collecting and guiding device configured to collect oil centrifugally flung from the clutch cage and to deliver the collected oil to the oil collection region of the housing; and
   a switching device coupled to the actuator ring and operable in an opened mode when the clutch is in its engaged state and further operable in a closed mode when the clutch is in its released state, wherein the switching device operates in its opened mode to permit oil in the oil collection region to flow into the coupling region and further operates in its closed mode to prevent the transfer of oil from the collection region to the coupling region.

10. The friction clutch assembly of claim 9, wherein the oil collection region of the housing is configured as an annular ring-shaped oil tank.

11. The friction clutch assembly of claim 10, wherein the oil tank is capable of holding the entire quantity of oil allocated to the clutch.

12. The friction clutch assembly of claim 10, wherein the switching device is shifted into its opened mode when the actuator ring moves axially in the first direction and is shifted into its closed mode when the actuator ring moves axially in the second direction.

13. The friction clutch assembly of claim 9, wherein the clutch cage includes openings permitting oil within the clutch plates to be discharged out of the clutch cage for collection by the oil collecting and guiding device.

14. The friction clutch assembly of claim 13, wherein the oil collecting and guiding device is configured such that the coupling region becomes free from oil and the clutch plates do not dip into an oil bath upon rotation of the clutch cage following shifting the switching device into its closed mode.

* * * * *